(12) United States Patent
Holzmann et al.

(10) Patent No.: US 6,804,634 B1
(45) Date of Patent: Oct. 12, 2004

(54) AUTOMATIC GENERATION AND REGENERATION OF A COVERING TEST CASE SET FROM A MODEL

(75) Inventors: Gerard J. Holzmann, Watchung, NJ (US); Margaret H. Holzmann, Watchung, NJ (US); James J. Striegel, Little Silver, NJ (US); Mihalis Yannakakis, Summit, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/506,297

(22) Filed: Feb. 17, 2000

(51) Int. Cl.$^7$ .......................... G06F 17/50; G06F 17/10; G06F 11/00
(52) U.S. Cl. ............................... 703/2; 703/22; 714/25; 714/33; 714/37; 714/38
(58) Field of Search .................. 703/2, 17; 714/25, 714/33, 37, 38

(56) References Cited

U.S. PATENT DOCUMENTS

| | | | | |
|---|---|---|---|---|
| 4,991,176 A | * | 2/1991 | Dahbura et al. | 714/738 |
| 5,377,201 A | * | 12/1994 | Chakradhar et al. | 714/741 |
| 5,490,249 A | * | 2/1996 | Miller | 714/38 |
| 5,652,835 A | * | 7/1997 | Miller | 714/38 |
| 5,870,308 A | * | 2/1999 | Dangelo et al. | 716/18 |
| 6,061,812 A | * | 5/2000 | Holzmann et al. | 714/38 |
| 6,308,299 B1 | * | 10/2001 | Burch et al. | 716/4 |
| 6,324,496 B1 | * | 11/2001 | Alur et al. | 703/17 |
| 6,389,576 B1 | * | 5/2002 | Lam et al. | 716/2 |
| 6,415,396 B1 | * | 7/2002 | Singh et al. | 714/38 |

OTHER PUBLICATIONS

Ball, T. "On the Limit of Control Flow Analysis for Regression Test Selection". Proc. of ACM SIGSOFT Int'l Symposium on Software Testing and Analysis. 1998. pp. 134–142.*
Jasper, R. et al. "Test Data Generation and Feasible Path Analysis". Proc. of ACM SIGSOFT Int'l Symposium on Software Testing an Analysis. 1994. pp. 95–107.*
Frankl, P et al. "An Analytical Comparison of the Fault–Detecting Ability of Data Flow Testing Techniques". Proc. of ACM SIGSOFT Int'l Symposium on Software Testing and Analysis. 1997. pp. 415–424..*
Goldberg, A. "Applications of Feasible Path Analysis to Program Testing". Proc. of ACM SIGSOFT Int'l Symposium on Softwar Testing and Analysis. 1994. pp. 95–107.*
Edmaonds, J. et al. "Theoretical Improvements in Algorithmic Efficiency for Network Flow Problems". Journal of the ACM. 1972. vol. 19, Issue 2, pp. 248–264.*

* cited by examiner

Primary Examiner—Kevin J. Teska
Assistant Examiner—Ayal Sharon (57) ABSTRACT

A method and apparatus for generating a covering set of test cases from a directed graph is provided. The directed graph includes nodes and edges connecting the nodes, and a test case is a path through the directed graph. To generate a partial set of test cases, a set of selected test cases is received. These test cases can be manually selected or they can be a maintained test case set. The edges or nodes on the directed graph (or requirements linked to nodes or edges) that are covered by the selected test cases are marked with an identifier. Test cases are then generated from the directed graph according to a coverage algorithm. Marked graph elements may, but need not, be included in the generated test cases. The resulting partial test case set together with the selected test cases satisfy the coverage criterion.

2 Claims, 10 Drawing Sheets

AUTOMATIC GENERATION AND REGENERATION OF A COVERING TEST CASE SET FROM A MODEL

FIELD OF THE INVENTION

The invention relates generally to test engineering in systems design and more specifically to the automatic generation and regeneration of covering test cases in test engineering.

BACKGROUND

In systems design, the requirements document typically specifies the behavior of a component for a given set of conditions. Prior to implementing a system, test cases are generated to test that the system satisfies the requirements. Test cases are ordered sets of inputs and descriptions of expected responses for the system under test. A test engineer either translates the requirements directly into a test script, or translates the requirements to a test model. If a test model is built, the test engineer may manually select test cases based on specified priorities, such as to test certain requirements. Alternatively, test cases can be generated from the test model using special purpose algorithms. These algorithms may optimize certain goals, like generating the fewest number of test cases to exercise all requirements.

Once the system has been implemented, new features are typically requested and added as users exercise the system, and old features may be modified or removed. The request for new or modified features is ordinarily formalized in the requirements document as new or changed requirements. Prior to deploying added features, test cases are created to test that the software complies with the new or modified requirements. Rather than creating all new test cases, sets of test cases for a system are typically maintained to ensure that critical functionality still operates correctly in view of new functionality. These test case sets are termed regression test cases, and the activity of testing a system to ensure conformance with legacy requirements is termed regression testing. Some test cases are also maintained because they are particularly useful in exposing defects or bugs. These test cases, called productive test cases, exercise those aspects of the system that are more likely to be disrupted by software changes. Regression test case sets and productive test cases are created and maintained over the life of the system.

When a test model is constructed based on the initial set of requirements, test generation algorithms implemented in a computer based tool can be used to generate a set of test cases that meet a specified coverage criteria. When new features are added to the system, the requirements for the new features serve as the basis for extending and modifying the test model. The test engineer extends and modifies the test model for the original system to reflect the new and changed requirements imposed on the system by the added features. The system that implements the original and added features is the incremented system, and the test model that reflects the original requirements and the requirements for the added features is the incremented test model.

A test engineer using known tools and methods has two options for generating a set of covering test cases for the incremented system. In the first option, the test engineer retains the entire original set or part of the original set of tests that were selected to cover the original system. The test engineer manually inspects the incremented test model and selects additional tests to achieve a desired coverage criterion such as to test all new requirements, test all requirements, cover all transitions, etc. If the portion of the incremented test model inherited from the original test model was modified to accommodate added features, then the test engineer must manually inspect and fix the portion of the incremented test model inherited from the original model to ensure that all the retained tests are valid for the incremented system.

This first option maintains the critical tests and productive tests from the original system and uses them in the testing of the incremented system. The disadvantages of this option, however, are that no method exists for automatically generating the remainder of the tests to achieve the desired coverage of the incremented system. Tests manually selected by a test engineer may achieve the desired coverage, but at the cost of being highly redundant as compared to tests selected algorithmically with the assistance of a computer based tool. Minimizing the number of tests generated to cover the system's functionality is desirable since testing resources are constrained and the portion of time allocated to testing a system prior to deployment is limited.

The second option for generating covering test cases for incremented systems is to discard the set of tests generated for the original system and generate new tests for the incremented system from scratch. Since none of the original tests are retained, there is no need to inspect and fix any of the original test cases. The disadvantage of this approach is that any critical tests and productive tests discovered during the testing of the original system will not necessarily be included in the newly generated set of test cases. Coverage criteria can be met with a minimum number of test cases and test lengths; however, the retention of critical and productive tests is compromised.

SUMMARY OF THE INVENTION

A method and apparatus according to the principles of the invention provides for the generation and regeneration of covering test case sets directly and automatically from a model. The model can be any of the type used in testing, such as ordinary and extended finite state machines or hierarchical graphs. In an exemplary embodiment, the model is in the form of a hierarchical graph, called a directed graph. A user retains test cases of interest by either manually selecting paths through the graph or by selecting test cases previously generated by test case generation algorithms. Paths are sequences of edges, shown as arrows on the graph, or sequences of nodes or nodes and edges. After selecting these test cases, a generator applying a coverage criterion (i.e., a test goal) to the graph generates or regenerates test cases covering the graph, according to the coverage criterion. During the generation or regeneration, nodes or edges that are part of the previously selected test cases need not be included in the resulting test cases. Similarly, undesired transitions in the model can be forbidden.

In an exemplary apparatus, a model editor provides for generation and manipulation of the directed graph. Each node references a message sequence chart (MSC), the empty set, or another directed graph. Requirements can be linked to a node or edge on a graph or to an object (event, timer, text box, etc.) in the MSC. The user selects a set of paths through the directed graph. This path may exercise functions of interest, or may effectively reveal system bugs. The apparatus automatically marks the edges and nodes in the selected paths, indicating that the edges and nodes are covered by the paths. A requirement is marked as covered (or optional) if a member of the selected set of nodes and edge has a link to the requirement either directly or in the case of a node to an MSC, if the attached MSC contains a link to the requirement.

If edge coverage is the selected criterion, in a subsequent generation of test cases, a covered node, edge or requirement need not be selected as part of another test case. A covered element is selected if the element is necessary to satisfy the coverage goal. The resulting covering test cases satisfy the chosen test goal; the set comprises the selected test cases and the generated test case set, where the selection of covered nodes or edges is minimized according to the selected criterion.

BRIEF DESCRIPTION OF THE DRAWINGS

A more complete understanding of the invention may be obtained from consideration of the following description in conjunction with the drawings in which.

DETAILED DESCRIPTION

The method and apparatus according to the principles of the invention provides for the generation or regeneration of partial test case sets from a model of the type used in test case generation. In an exemplary embodiment, the model is a directed graph comprising nodes and edges (or arcs) connecting the nodes. Test cases are paths through the graph; the paths can be identified as a list of adjacent edges or a list of adjacent nodes and edges. The method of the invention identifies the nodes, edges or requirements covered by test cases for a particular graph. Test cases can be automatically selected test cases, test cases selected by a user or a combination of automatically and manually selected test cases, and are hereafter collectively referred to as selected test cases. When test case selection algorithms are applied to the graph, the identified nodes, edges and requirements are selected by the coverage algorithm when necessary to achieve coverage of an unselected node, edge or requirement. The user can also mark transitions as forbidden when, for instance, the user wishes to disable a certain subsystem or feature, or as required where, for example, a certain transition is required. The resulting test case set together with the selected test cases achieves the selection algorithm's goals while maintaining the selected test cases.

Architecture of an Exemplary System

Figure 1A:
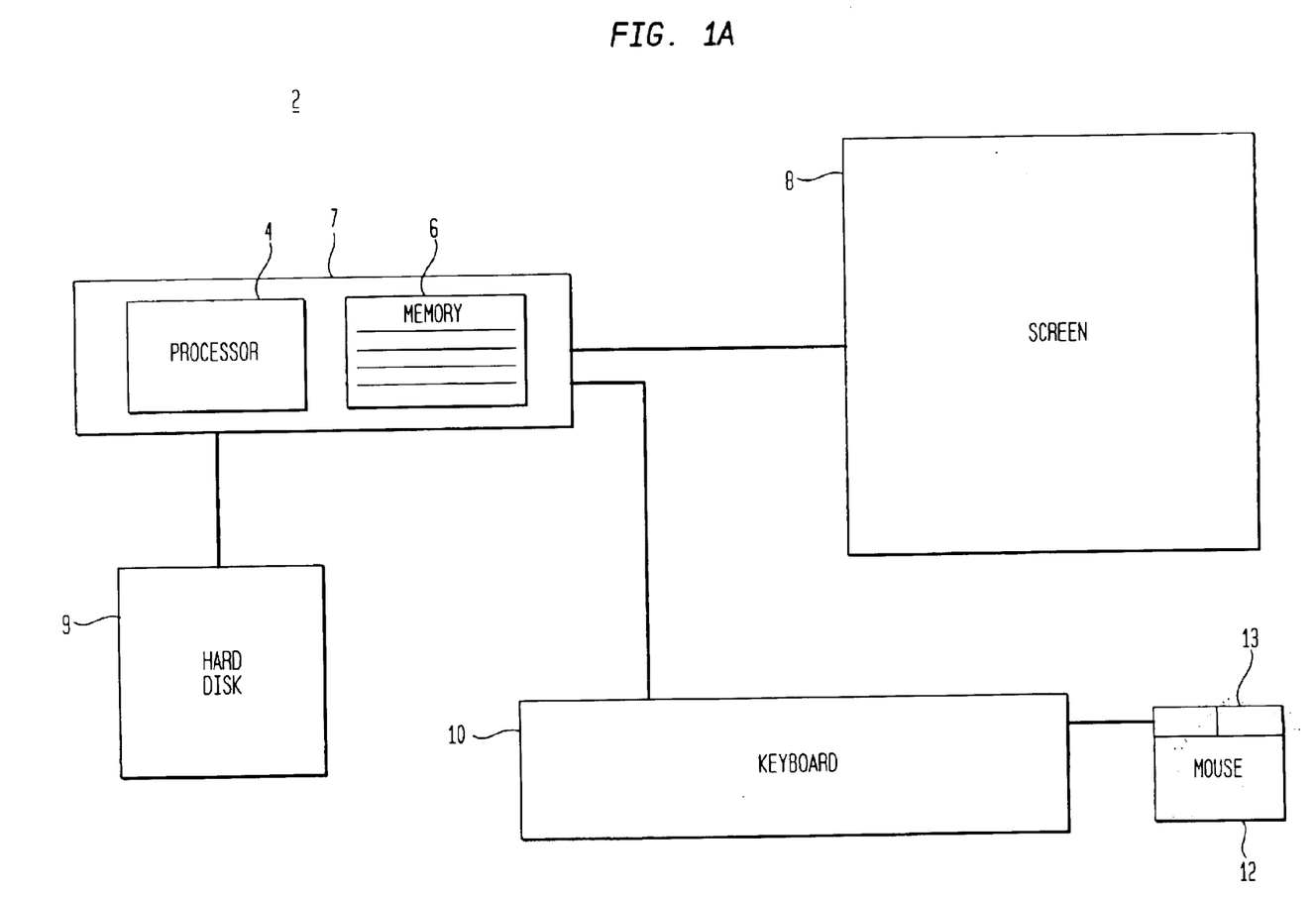
FIGS. 1A and 1B show the architecture of an exemplary system according to the principles of the invention.

FIG. 1A illustrates an exemplary embodiment of a computer-based system 02 for carrying out the method of the invention. The system 02 comprises a processing unit 07, a display screen terminal 08, input devices, e.g., a keyboard 10, and storage devices, such as a hard disk 09. The processing unit 07 includes a processor 04 and a memory 06. The memory 06 includes areas for storing, among other things, instructions for the processor 04. A selection device 12 is operable to select objects displayed on the display 08 when the system 02 operates with a graphical user interface (GUI). The screen 08, keyboard 10 and selection device 12 are collectively known as user interface devices. In one embodiment of the invention, the system 02 utilizes UNIX® as the computer operating system and XWindows® as the windowing system for providing an interface between the user and the GUI. UNIX® and XWindows® can be found resident in the memory 06.

Processor 04 is a general purpose processor capable of executing a stored program routine that implements the test generation method described herein. Memory 06 can consist of a single memory chip or multiple banks of memory, and the memory 06 can include Read Only Memory (ROM) and Random Access Memory (RAM). The storage device 09 is capable of storing and transmitting data and can consist of multiple storage units that are linked together. The storage device 09 may store, among other things, a directed graph representation, test cases and the output results produced by the method of the invention. The representation contains the information necessary for the system 02 to, for instance, display a directed graph image on the system's 02 display terminal 08. The representations can also be kept in memory 06 and moved to storage 09. Representation and output results stored in the storage unit 09 are transmitted to processor unit 04 through an I/O bus (not shown).

When implemented as a set of instructions for the processor 04, the system architecture includes a model editor implemented as TCL/TK modules, which can be found resident in memory 06. In this embodiment, the selection device 12 controls a pointer in a window displayed on the terminal 08 and the user manipulates the device 12 to manipulate a hierarchical graph image. TCL is a simple scripting language (its name stands for "tool command language") for controlling and extending applications. TK is an XWindows toolkit which extends the core TCL facilities with commands for building user interfaces having Motif "look and feel" in TCL scripts. Motif "look and feel" denotes the standard "look and feel" for XWindows® as is known in the art and defined by Open Software Foundation®. TCL/TK information and related products are available from The TCL/TK Consortium through its web site. The URL is www.tclconsortium.org. TCL and TK are fully described by John K. Ousterhout in a 1994 publication entitled "TCL and the TK Toolkit" from Addison Wesley Publishing Company.

Figure 1B:
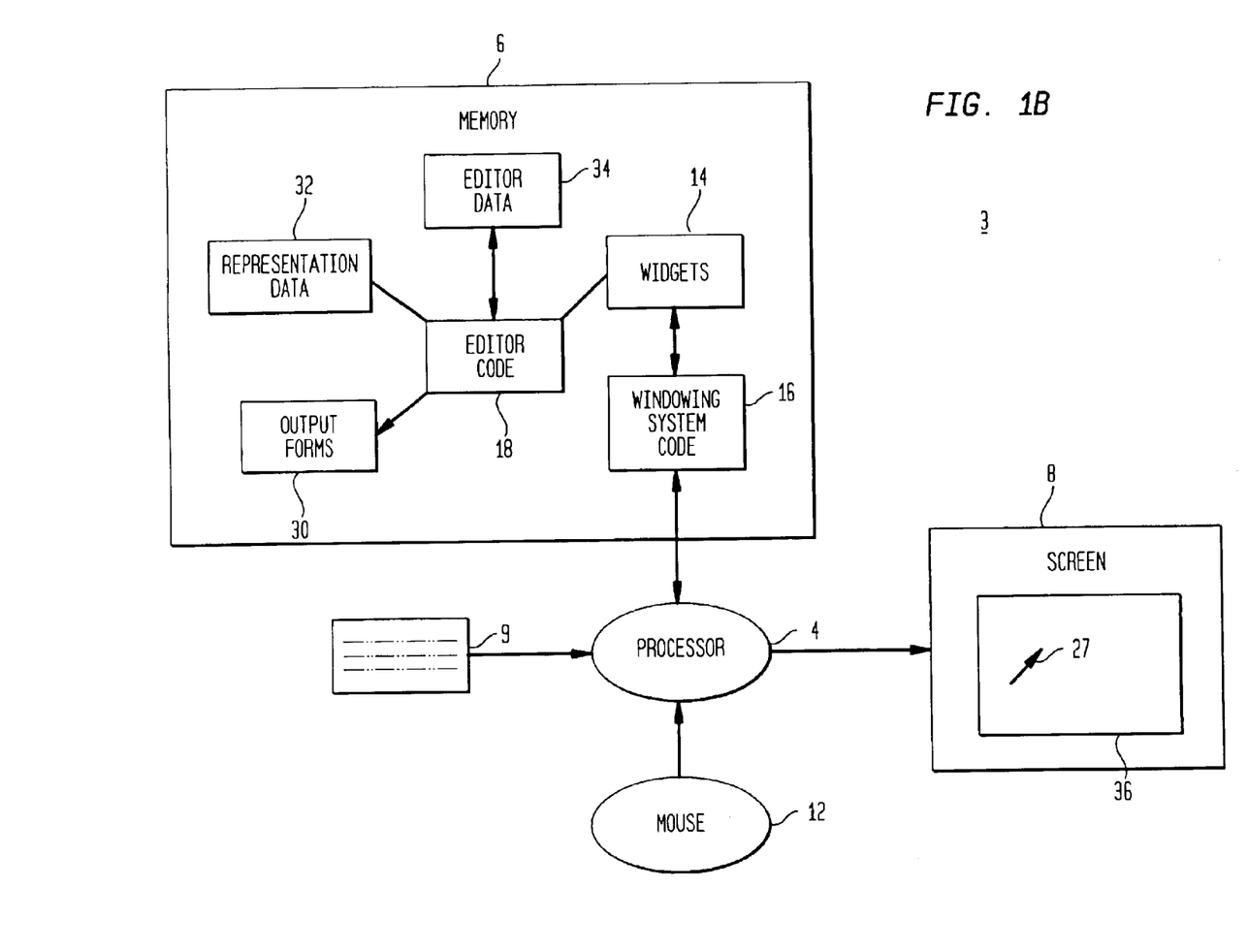

Referring now to FIG. 1B, the system 02 employed as an editor 03 is shown. Memory 06 contains graph editor code 18 and windowing system code 16 and three sets of data structures: widgets 14, which are the data structures used by windowing system 16 to interact with graph editor code 18, graph representation data 32, and graph editor data 34, which contains data used by graph editor code 18 in interacting with graph representation data 32 and widgets 14. Depending on how the editor 03 is being used, memory 06 may also contain other forms of output 30 produced by graph editor code 18. In one embodiment, these other forms of output include a text file, a G1F file, and a Postscript file for a hierarchical graph. Other embodiments may also include an output which is a representation of the hierarchical graph and which can be used as input to a system verification program. Data, such as representation data 32, can be stored in storage device 09 and moved into or out of memory 06.

If a representation 32 of a directed graph already exists, the model editor 03 reads the representation and sets value in widgets 14 such that window system code 16 displays the graph represented by the representation in window 36. The user can then manipulate the contents of window 36 with the keyboard 10 or the pointing device 27. The user inputs to the keyboard or pointer device result in hardware interrupts to which windowing system code 16 responds by updating window 36 to reflect the input, by setting values in widgets 14 representing the affected components of window 36 and by invoking call-back functions in hierarchical graph editor code 18 for those widgets whose values have changed.

The call-back function examines the changed values and if they indicate a change in the graph displayed in window 36, graph editor code 18 alters graph editor data 34 to reflect the change. Graph editor data 34 thus always indicates the current state of the graph. As with other editors, the user can command the Hierarchical Graph editor 03 at any time to produce a representation 32, and graph editor code 18 will use the data in editor data 34 to produce a new representation 32 which reflects the directed graph as it exists when the representation is made. If the changed values of widgets require that the graph be modified, hierarchical graph editor code 18 sets values in widgets 14 as required to modify the graph, and windowing system code 16 responds to those changes by changing the appearance of the graph in window a 36.

Manual Selection of Test Cases

Figure 2A:
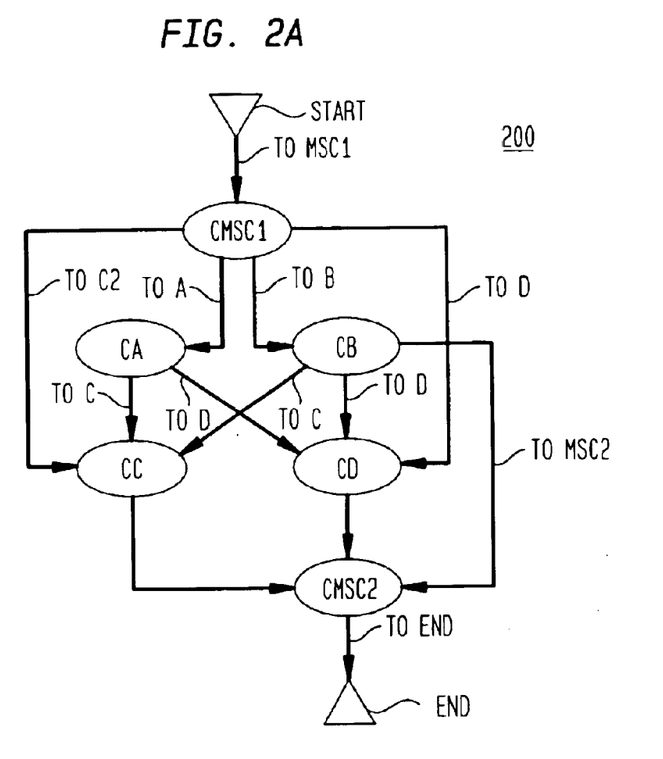
FIGS. 2 and 3 show exemplary directed graphs according to the principles of the invention.
Figure 3:
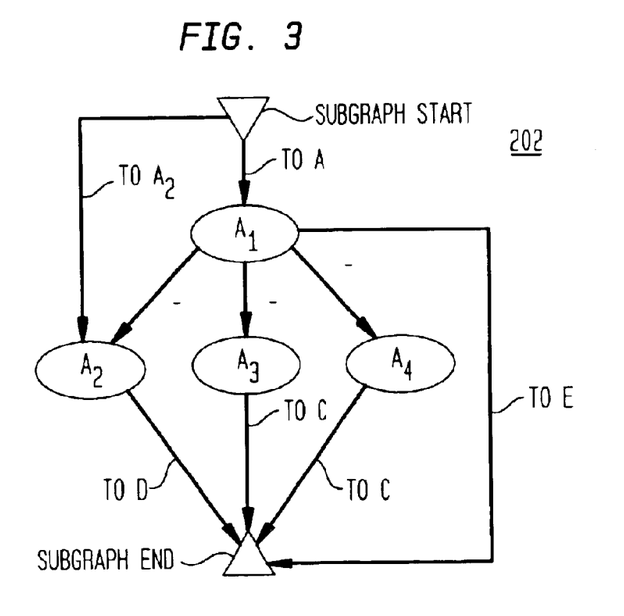

The manual selection of test cases will now be described with reference to FIGS. 2 and 3 as well as 1A and 1B. In an exemplary embodiment, the model editor 03 constructs a directed graph representation. For a description regarding the generation of directed graphs, refer to E. R. Gansner, E. Koutsofios, S. C. North, and K-P. Vo, "A Technique for Drawing Directed Graphs," *IEEE Transactions on Software Engineering*, Vol. 19, No. 3, May 1993, pages 214 to 230. A parent graph image, which can be reconstructed and displayed on the screen 08 using the system 02 and representation data 32, is shown in FIG. 2. The parent graph 200 comprises a START node, an END node, nodes CMSC1, CA, CB, CC, CD and CMSC2, and the edges connecting them. Nodes CMSC1 and CMSC2 reference message sequence charts, and nodes CA, CB, CC and CD reference subgraphs. The graph 200 can represent processes having a state at the START node and proceeding to the END node. A further discussion of directed graphs and related concepts is found in Holzmann, Peled and Redberg, "Design Tools for Requirements Engineering," *Bell Labs Technical Journal*, Winter 1997 at 86–95, which is incorporated herein by reference.

The hierarchical nature of directed graphs is further described with reference to FIG. 3. A subgraph 202 comprises a subgraph START node, a subgraph END node, nodes A1 to A4, and the edges connecting them. In the parent graph 200, node CA references this subgraph 202. Using the system 02 operating on the representation 32, this subgraph can be displayed on the screen 08. In one embodiment, the user interface devices permit selecting, for example, the node CA by clicking the mouse 12 when the pointer 27 points to the node CA. The editor 03 updates the display to show the subgraph 202, as previously described. The user may deselect the subgraph by right button clicking the mouse 12 while the pointer 27 points to the subgraph 202. When this occurs, the parent graph is shown on the terminal 08.

A user can also manipulate the pointer 27 and select nodes and edges by depressing the mouse 12 selection button when the pointer 27 points to the desired nodes and edges. To select a test case manually, the user selects a sequence of edges representing a path through the graph or one or more nodes that must be included in the test case. When a user selects nodes or edges, the selected nodes or edges are stored in memory 06 or storage device 09 as a selected test case.

When nodes are selected, paths through the nodes are generated. The edges in the paths constitute a test case. At the user's option, a plurality of test cases can be stored as a test case set; that is, the test cases are identified by a test case set label. When manually selecting test cases, the selected edges are highlighted on the display 08.

Generating Test Cases Automatically

In addition to the just-described manual selection of test cases, the system 02 operating according to the principles of the invention also provides for the automatic generation of test cases and regression test cases. The application of selection algorithms to the directed graph representation automatically generates a set of paths (test cases) through the graph. The precise algorithm is not important, and various algorithms can be chosen or developed depending upon the desired coverage goals. For example, one algorithm implemented in the exemplary embodiment provides a substantially minimum set of paths which encompass all the edges of a particular directed graph representation.

This algorithm finds a set of test paths through a directed graph starting at the initial node. The path set covers all the edges and has two properties: (1) the number of paths are minimized; and (2) the total length of the paths is minimized among all the sets that satisfy (1). As would be known to one of ordinary skill in the art, this problem is an extension of the Chinese Postman problem, which minimizes criterion (2). The specification of the Chinese Postman problem, Euler tours and minimum cost flows are set forth in J. Edmonds, E. L. Johnson, "Matching, Euler Tours and the Chinese Postman," *Mathematical Programming* 5 (1973), 88–124; J. Edmonds, R. M. Karp, "Theoretical Improvement In Algorithmic Efficiency For Network Flow Problems," *J. ACM* (1972), 248–264; and E. L. Lawler, "Combinatorial Optimization: Networks and Matroids," *Holt, Rinehart & Winston*, 1976.

Other algorithms that operate on a graph representation of a test model can include those algorithms that provide desirable coverage. For example, algorithms that achieve coverage of all nodes, coverage of some nodes, coverage of requirements, coverage of some edges, coverage of all nodes and edges, coverage of some nodes and some edges, and coverage by cost can be implemented in the matter of the invention. In the coverage by cost selection criterion, elements, which are edges or nodes, are marked with a priority (or weight or cost) and minimum paths are selected recursively until the graph is covered or until some other goal is met (e.g. a maximum number of test cases is reached). Of course, other types of coverage goals can be achieved using various test generation algorithms.

The Generation or Regeneration of a Covering Test Case Set

The system 02 operating according to the principles of the invention provides for the generation or regeneration of a covering set of test cases from a selected set of test cases and an incremented model. For any system having selected test cases, either maintained as a regression test case or a productive test case set, generated by manual selection, or generated by some algorithm, a subsequent, covering test case set can be generated. When a user manually selects a set of test cases or when an algorithm selects a set of test cases, the edges or nodes in the set are marked as covered or optional. Any edge or node marked as covered may, but need not, be included in a subsequent test case set. If the user wishes to forbid certain transitions, the relevant nodes and edges are marked forbidden. The system then generates a test case set to achieve some coverage criteria, such as covering all edges or nodes with a minimum number of test paths. The resulting covering test case set covers elements necessary to achieve the test goal in view of the existing selected test case set. In other words, if edge coverage is the criterion, the resulting covering test case set optionally includes covered edges.

Figure 4A:
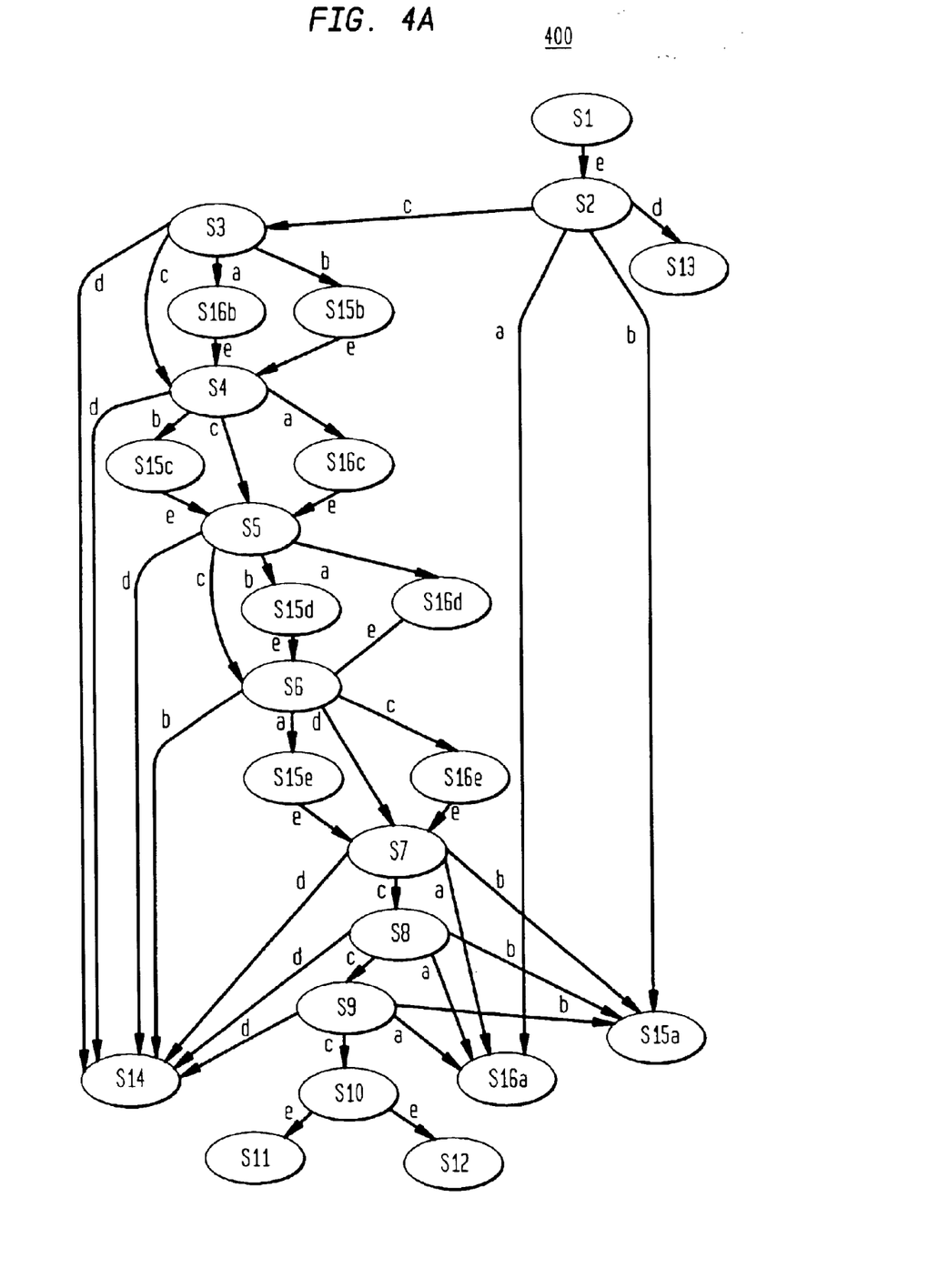
FIGS. 4A and 4B shows exemplary directed graphs showing covered edges and nodes, respectively.

An exemplary directed graph having covered nodes is shown in FIG. 4A. The graph 400 includes multiple nodes and edges and there are multiple paths through the graph. In this example, three nodes, S1, S2 and S15a are marked as covered nodes. The marking is shown as an asterisk, although any known method for labeling an object can be used. The covered set of edges, therefore, includes edge "e" connecting S1 to S2 and edge "b" connecting node S2 to node S15a. The path represented by these elements may be a list of the adjacent edges, e and b, a list of adjacent nodes, S1, S2 and S15a, or a list of nodes and edges comprising the path, S1, e, S2, b and S15a. In a generation of test cases, where the coverage criterion requires that all nodes be included in a test path and that the number of paths be minimized, the covered nodes may, but need not, be included in the additional test cases. The generated test case set and the covered test case will satisfy the coverage requirement.

Figure 4B:
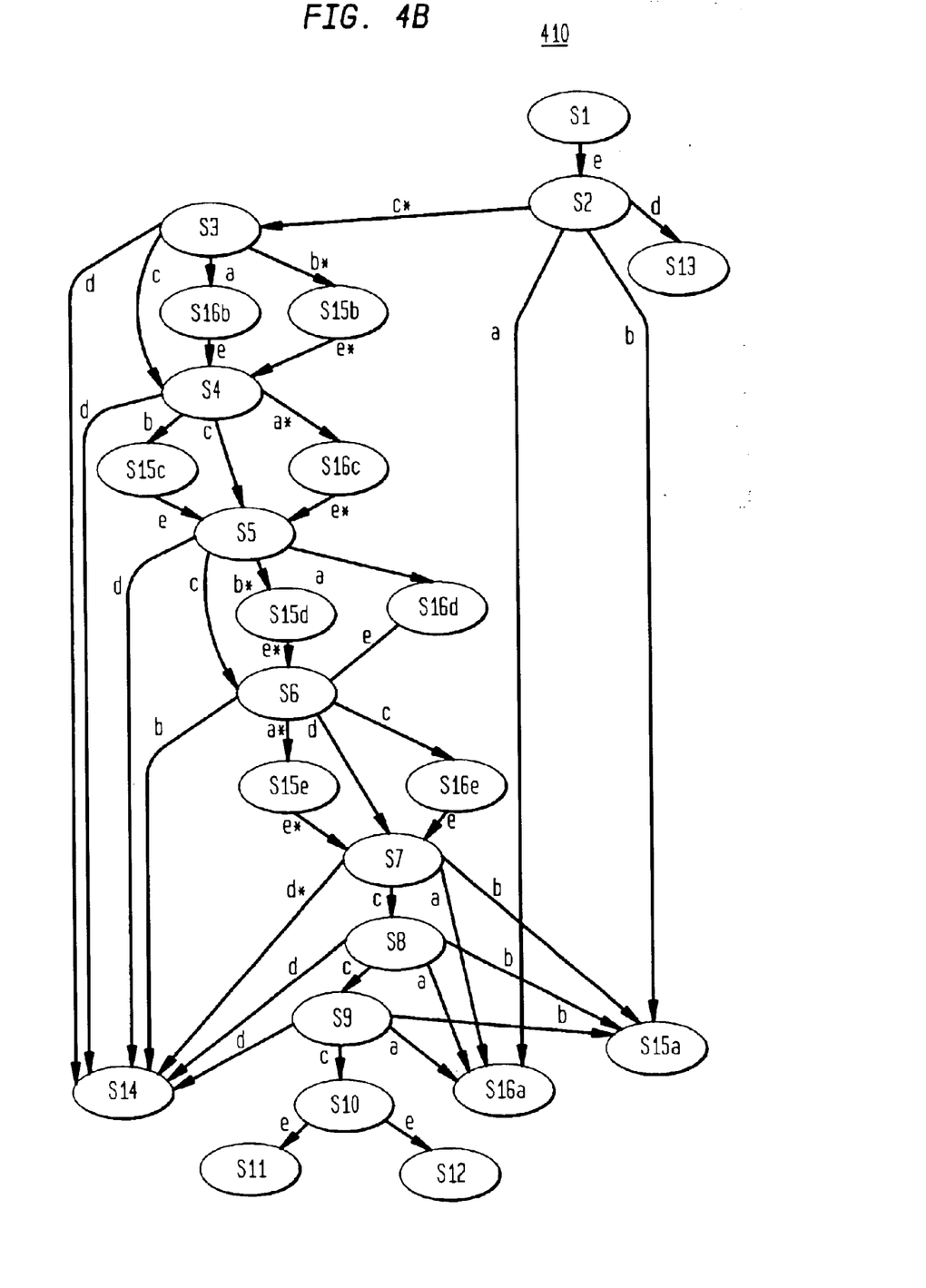

In FIG. 4B, covered edges are again marked with an asterisk. The path defined by the covered edges includes nodes S2, S3, S15b, S4, S16c, S5, S15d, S6, 5e, S7 and S14. In a generation of test cases, paths that include any of the covered edges can be generated. So, for instance, the node S6 has branches, one of which leads to S14. A test case defined by the path that includes nodes S2, S3, S1 5b, S4, S1 6c, S5, S1 5d, S6 and S14 is generated, if it is required to satisfy a chosen coverage criterion.

For test case regeneration, an existing directed graph is modified in view of new functionality or deleted functionality, as previously described. Prior to regenerating test cases for the modified graph, the maintained or selected test case set is overlayed on the modified graph. Where the edges, nodes or requirements comprising the selected test cases overlay edges on the modified graph, the edges on the modified graph are marked as covered or optional. During test case regeneration, these covered elements may, but need not, be included in the regenerated test case set. The resulting test case set in combination with the selected test case set achieves the desired coverage criterion.

Figure 5:
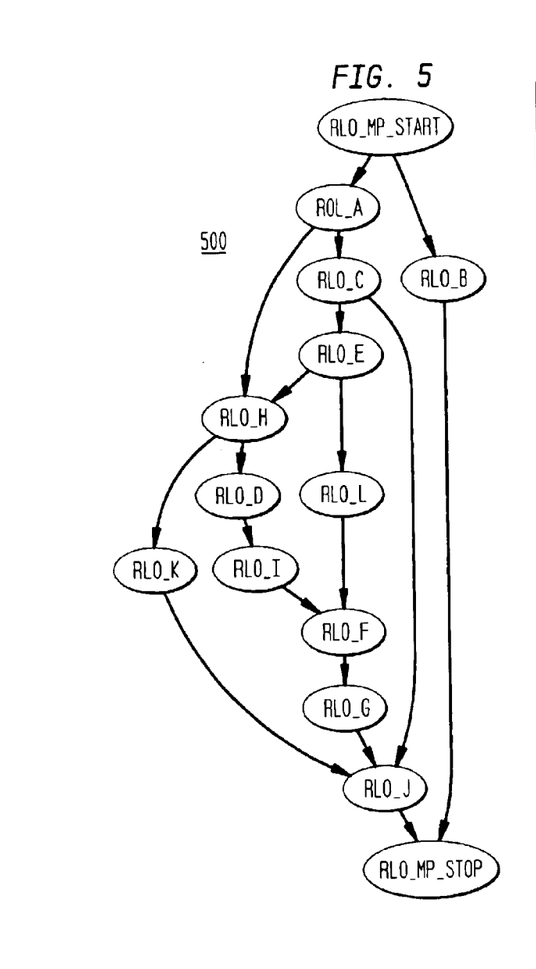
FIG. 5 shows an exemplary test model according to the principles of the invention.
Figure 6A:
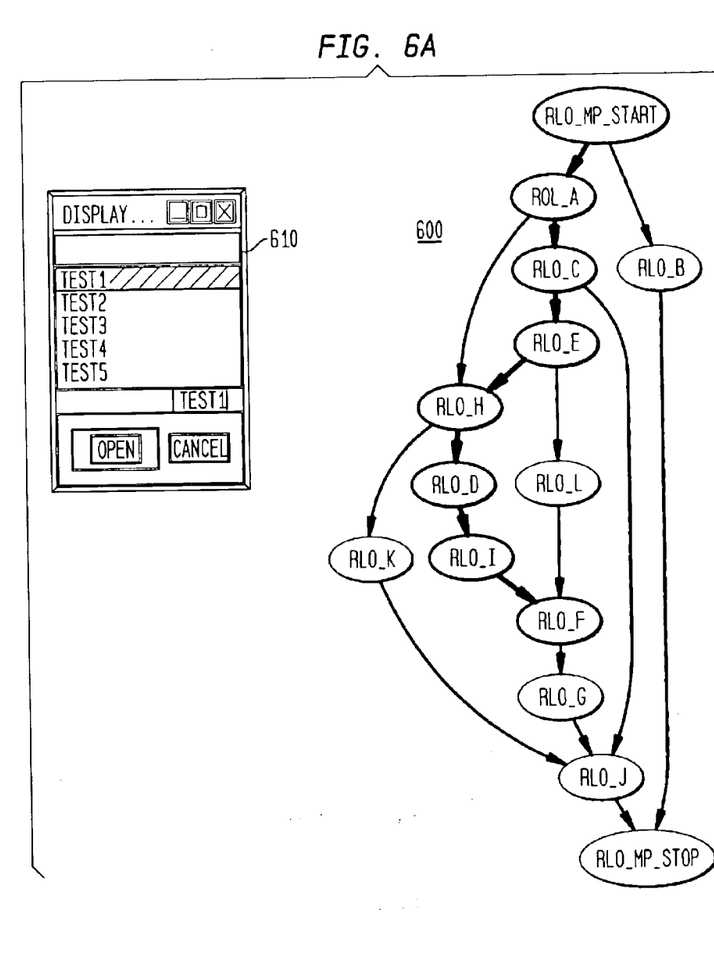
FIGS. 6A through 6E shows exemplary display graphics.
Figure 6B:
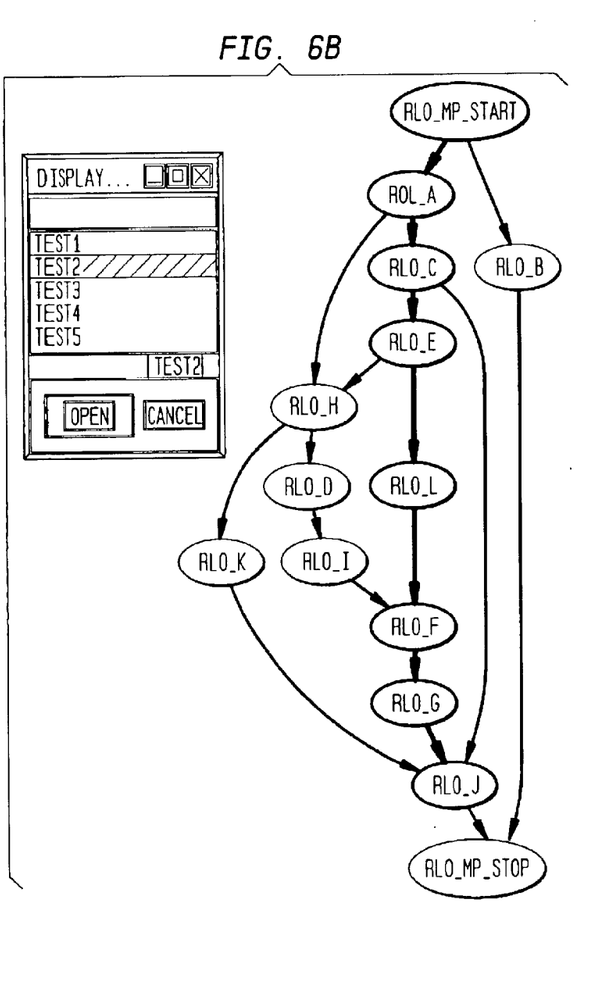
Figure 6C:
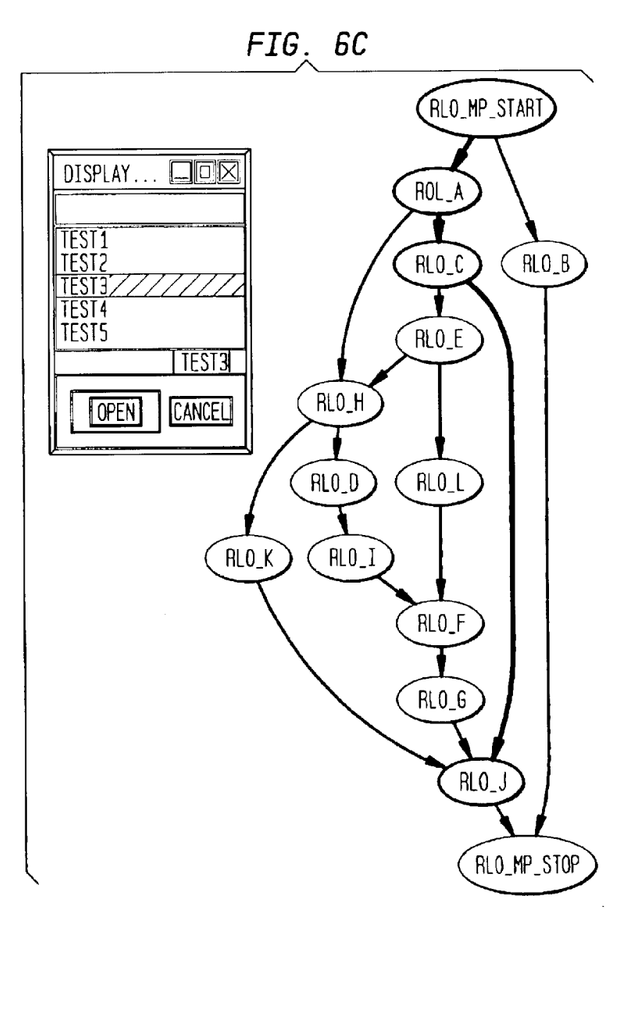
Figure 6D:
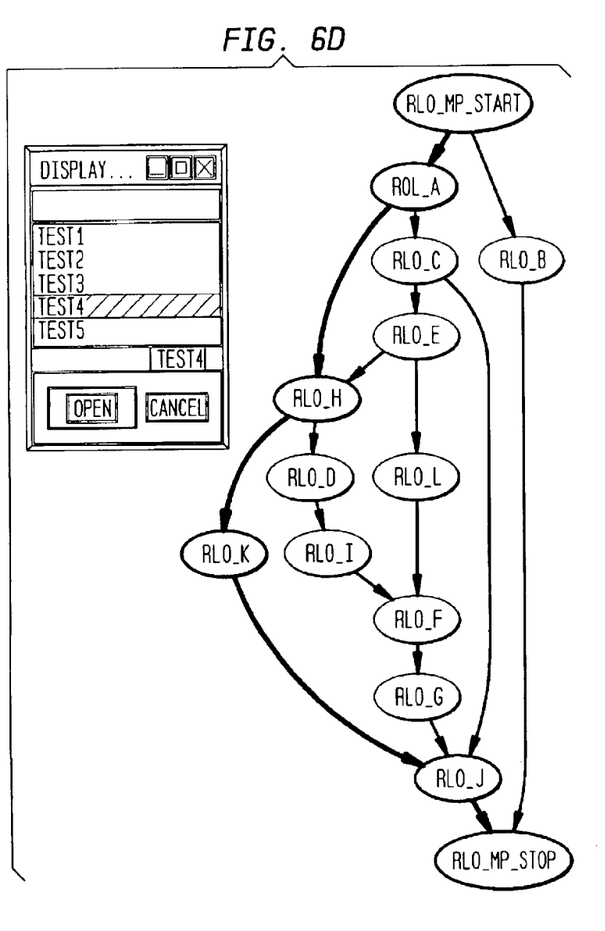
Figure 6E:
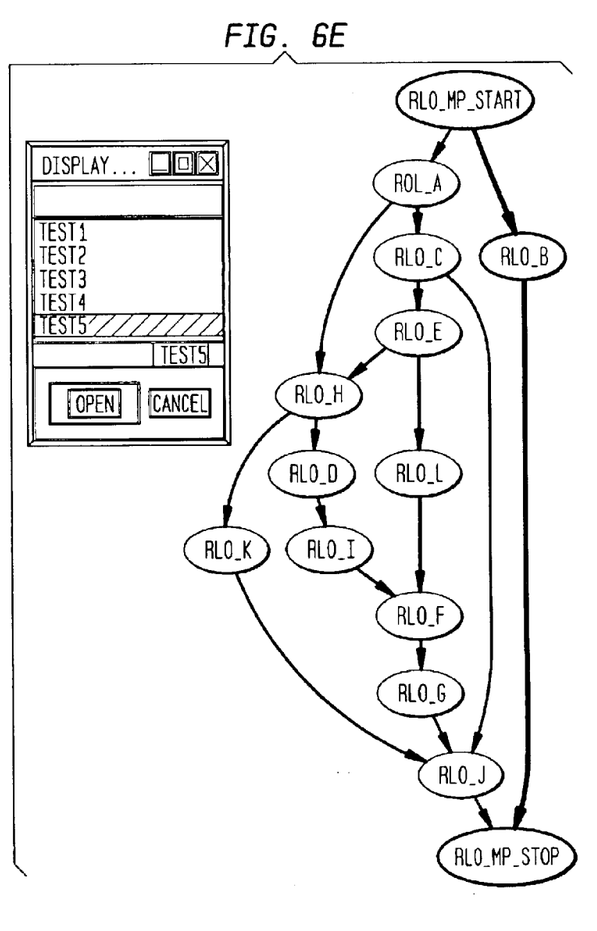

An exemplary test model that can be manipulated and displayed with the system 02 is shown in FIG. 5. The test model 500 includes start node RLO_MP_START, end node RLO_MP_STOP, nodes RLO_(A . . . F) and the edges connecting the nodes. Excluding the start node and the end node, each node references a message sequence chart or makes no reference. In FIGS. 6A to 6E, exemplary graphics displayable using the system 02 of FIG. 1A and for illustrating test cases selected from the test model 500 are shown. Referring to FIG. 6A, the display graphics 600 include a selection menu 610 and a highlighted test model 612. The selection menu 610 shows icons Test 1, Test 2, Test 3, Test 4 and Test 5. Selection of one of these icons causes the system 02 to display a corresponding test case. In FIG. 6A the test case corresponding to Test 1 has been selected and the test model 612 with the selected test case highlighted is displayed. Likewise, FIGS. 6B to 6E show an exemplary display when Test 2 through Test 5 have been selected, respectively. Each test case is displayed as a path through the graph.

Figure 7A:
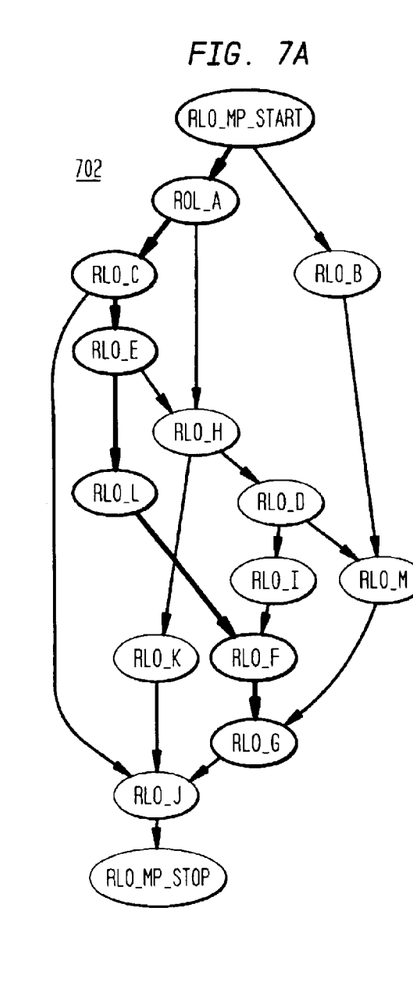
FIGS. 7A to 7C show exemplary incremented test models.
Figure 7B:
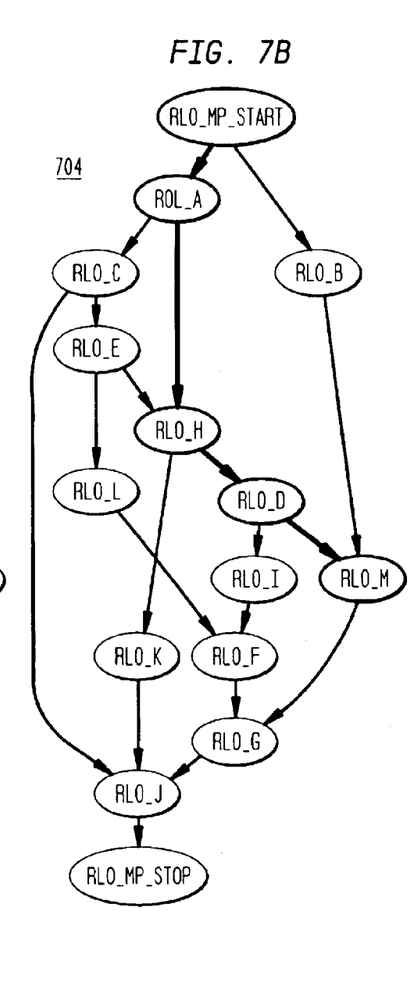
Figure 7C:
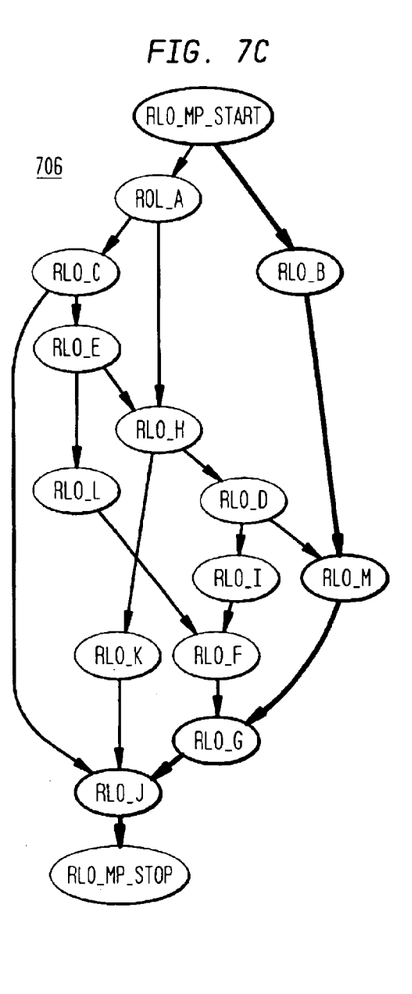

The system 02 can retain these test cases for use on incremented models. For example, FIGS. 7A to 7C show three equivalent incremented models (702, 704 and 706 respectively). In each model, node RLO_M has been added, one edge has been removed, and two edges have been added to the test model 500 shown in FIG. 5. In FIG. 7A, Test 1 has been retained and overlayed on the incremented model 702. The test case corresponding to Test 1 nodes include RLO_A, RLO_C, RLO_E, RLO_H, RLO_D, RLO_I, and RLO_F. This is shown graphically by highlighting the nodes and edges in the test path. Similarly, FIG. 7B shows Test 3 on the second incremented model 704 and FIG. 7C shows Test 4 on the third incremented model 706.

Figure 8:
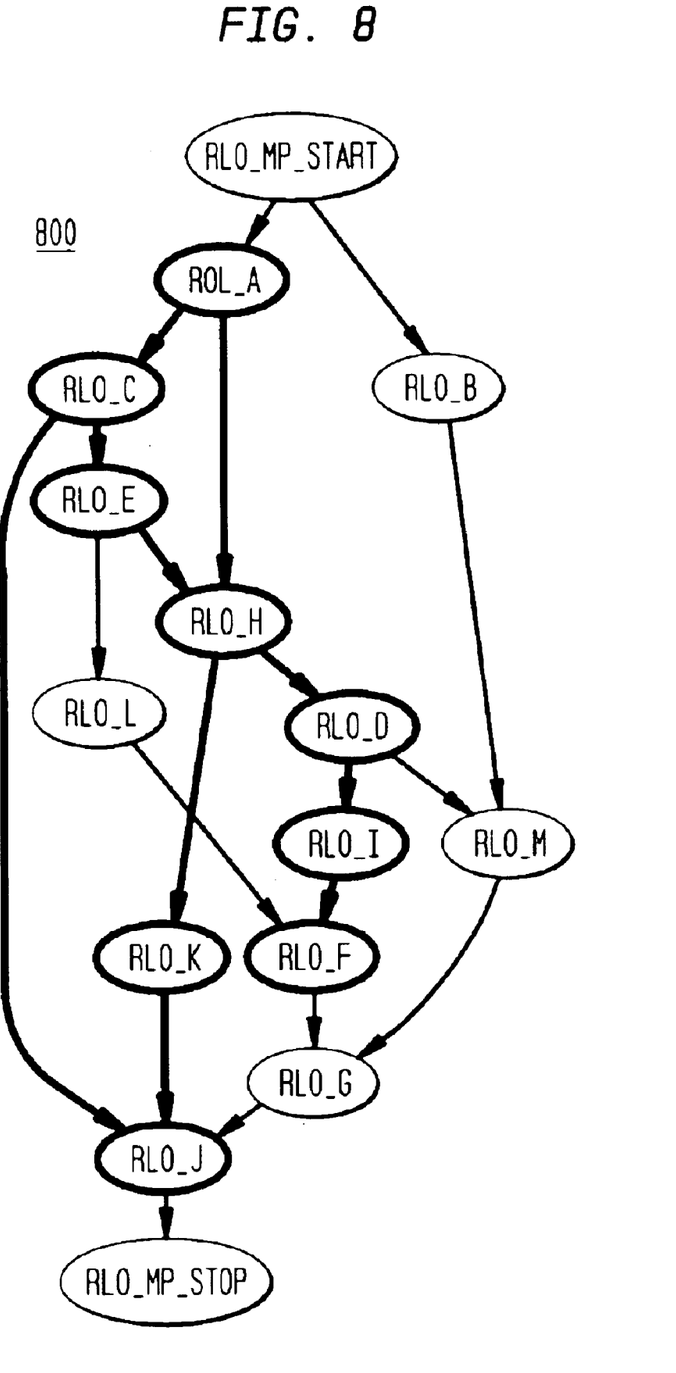
FIG. 8 shows another exemplary incremented test model.

The incremented models and retained test cases can be used to regenerate a minimum covering test case set. Referring to FIG. 8, the incremented model 800 is shown with the nodes and edges comprising Test 1, Test 3 and Test 4 overlayed on the incremented model. The model 800 is the same as the models shown in FIGS. 7A to 7C. The paths through the model 800 corresponding to Test 1, Test 3 and Test 4 are marked as covered. This is illustrated by showing the paths in bold. In a subsequent regeneration of a covering test case set, covered elements may, but need not, be included in the regenerated test cases.

An exemplary method for generating covering test case sets according to the principles of the invention is as follow: In a receiving step, a directed graph, G (the test model), with a set of nodes, V, a set of edges, and a start node $S_o$ is received. As per the method of the invention, G's nodes and edges are classified as required, optional or forbidden. Since test paths should start at $S_o$, this node is classified as a required node.

In a first process step, all forbidden nodes and edges are removed from G. The resulting graph is referred to as G1 for ease of reference. A depth-first search on G1, beginning from the start node, identifies the unreachable nodes and edges, and determines the strongly connected components of the graph. Strongly connected (or strong) components contain cycles that do not reach other parts of the graph. The unreachable nodes and edges are removed in a process step, and the nodes and edges of each strong component are removed and replaced with one new node. This new node is made the head or tail of all edges that were incident to the nodes of the strong component. If a strong component contained a required node or edge then the replacement node is classified as required, otherwise the replacement node is classified as optional. The edges on G1 retain their classification. For parallel optional edges of G1, only one copy is retained. The resulting graph, G2, is an acyclic graph that includes only required and optional nodes and edges.

In a next process step, G2 is modified such that classifications are placed only on the edges. To make this modification, every node classified as required in G2 is replaced by two new nodes, v1 and v2. These nodes are connected by an edge from v1 to v2. If, for example, v is the original start node, then v1 is the new start node. All edges that impinged on the v are directed into v1, and all edges that were coming out of v come out of v2. The edge from v1 to v2 receives the classification of the v, and the other edges retain their classification. The resulting graph is referred to as G3.

In a definition step, the deficit of each node in G3 is defined to be the difference between the number of required edges exiting the node and the number of required edges entering the node. This deficit is computed for each node in G3.

In a process step, a network N is constructed from G3. To construct N, a new source node, s, and a new sink node, t, are added to G3. A process step adds arcs from s to all nodes in G3 with positive deficit, with the capacity of each arc equal to the deficit of the node. The cost of each such arc is set equal to 0. Arcs are also added from all nodes with negative deficit to t with the capacity of each arc equal to the absolute value of the deficit of the node. The cost of each arc is set equal to 0. Arcs are added from all nodes of G3 to s with infinite capacity and cost equal to some very large number. Every arc of G3 is given infinite capacity. The edges of the form v1 to v2 previously introduced receive cost 0 and the other edges of G3 have cost equal to 1.

A process step solves a minimum cost, maximum flow problem on the network, N. The resulting optimal flow is used to obtain a graph, H, on the same node set as G3. To obtain H, for each arc from u to v in N, excluding those incident to s and i, H contains a number of parallel arcs from u to v that are equal to the flow along the arc from u to v in the optimal solution, if the arc is optional. If the arc is required, the parallel arcs are equal to one (1) more than the optimal flow. (If the flow is 0 and the arc is optional then no arcs from u to v are included in H.) The graph H is Eulerian and connected. In H, each replacement pair of nodes v1 and v2 and the interconnecting arc(s) are replaced by their original node, v. The resulting graph H' is also Eulerian and connected. An Euler path is constructed in H' starting at the start node.

To transform back to G1, remove from the Euler path the arcs of very large cost incident to the start node that were added earlier, yielding a set of paths of G2 from the start nodes: these paths are the "selected" paths of G2. These selected paths are transformed into paths of G1, which are legal paths of the original graph G (legal paths contain no forbidden elements), by replacing every occurrence of a node corresponding to a shrunk strong component of G1 by a suitable path through the strong component.

For example, where v is an optional node of G2 that replaced a strong component, S, and p is a selected path that includes v, the arc of p, entering v corresponds to an arc of G1 entering a node x of S. Likewise, the arc of the path p exiting v corresponds to an arc of G1 exiting a node y of S. Node v is replaced in p by a path of G1 from x to y, preferably a shortest path. (Note that v may occur in several selected paths, and the nodes x and y, and the corresponding replacement subpaths, may be different for the different paths).

When v is a required node, the transformation is this: v is a required node if the corresponding strong component, S, contains one or more required edges and/or nodes. Node v occurs in at least one selected path of G2 (since it is required). For each occurrence of v in in a selected path, it is replaced by a suitable path of G1. If v occurs in k paths, p1, . . . pk, and for each path pi, xi and yi are the nodes of the strong component S that are incident to the path edges that enter and exit v, a set of paths, q1, . . . qk are chosen within S. Each path qi traverses from xi to yi and the k paths collectively cover all the required nodes and edges of S. q1, . . . qk represent the x replacement subpaths for the k occurrences of v. The paths, qi, collectively cover all the required elements of the strong components, S. They also have appropriate starting and ending nodes (xi and yi); they can replace v in the selected paths of $G_2$.

To determine suitable paths qi choose the first k−1 paths qi, where i=1, . . . k−1, to be the shortest paths from xi to yi. The last path qk is chosen to cover all the required elements (nodes and edges):

1. Starting from xk perform a breadth first search in S until some required element, say b, is encountered for the first time. This determines a shortest path from sk which becomes the initial portion of qk.

2. A next breadth first search is performed in S starting from b until another required element (if any is left) is reached. This determines a second segment of qk. Continue in this manner until all the required elements are covered.

3. A shortest path is constructed from the last required element to yk. The paths thus chosen, qi, are used to replace node v in the selected paths pi.

A number of other variations are possible in the selection of the paths q, and some could lead to shorter paths. For example, if k>1, it is not necessary to pick all required elements of S with one path, but different paths can pick some of the required elements. Second, it is not necessary that the paths qi obey the xi-yi correspondence: if the path from x1 ends at y2 and the path from x2 ends at y1, then paths p1 and p2 can swap their suffixes past node v.

It is also advantageous to optimize the total length of the test paths. If the original graph G (or G1) is acyclic (as is for example the graph of FIG. 4A), then the selected paths have minimum total length among all test sets with the minimum number of tests. If the graph is cyclic but the cycles (equivalently, if the nontrivial, strong components) contain only optional elements, then both a minimum set of test paths of minimum length is found by a modification of the algorithm in which the strong components are not shrunk. The rest of the steps stay the same.

This modified algorithm will also yield a minimum set of paths of minimum length in the cyclic case where the cycles contain required elements, if the graph H is connected. This occurs in, for example: (i) the above mentioned case where required elements do not participate in any cycles, and (ii) the case when the required elements include a weakly connected subgraph, not necessarily spanning all the nodes or edges of the graph. (A subgraph is weakly connected if the corresponding undirected graph obtained by ignoring the directions of the arcs is connected.) The latter case may arise for example when the required elements represent a newly added section to the model corresponding to a new feature of the system and the new portion is weakly connected. A special instance of case (ii) is the complete coverage problem, where we want to find a test set that covers all the edges of the model.

Generating a Test Harness

To generate a test harness where the model is a hierarchical graph, the test cases are converted to a composite message sequence chart (MSC). The invention designates each object or process in the extended MSC as within the system to be tested or external to the system to be tested (that is, within the test harness). The system 02 constructs a list of the process names in the MSC of interest and presents the user with the names. The user then selects those processes to be tested and those within the test harness. Those processes contained within designated processes are assigned the same designation. Alternatively, the user may input the name of all processes prior to importing an extended MSC, and the user makes designations prior to importing the MSC. If a translation is required between the naming conventions used in the test system and the naming conventions used in the test harness, the test model elements can be mapped to the test system representation elements.

Each extended MSC (test case) is evaluated based upon the message interchanges in the MSC and finite state machines are automatically generated for each object or process in the test harness. As is known in the art, these finite state machines exhibit sufficient behavior to stimulate the test system and to react to responses from the test system.

For details regarding the automatic generation of test harness objects from MSC specifications, refer to S. Leue and P. Ladkin, "Implementing and Verifying MS Specifications Using Promela/XSPIN," *DIMACS-Series in Discrete Mathematics and Theoretical Computer Science*, Vol. 32, The Spin Verification System, *American Mathematical Society*, 1996.

As detailed above, the invention can be embodied in the form of methods and apparatuses for practicing those methods. The invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The invention can also be embodied in the form of program code, for example, in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It is to be understood that the invention is not limited to the illustrated and described forms of the invention contained herein. It will be apparent to those skilled in the art that various changes may be made without departing from the scope of the invention and the invention is not considered limited to what is shown in the drawings and described in the specification. The model, for example, need not be hierarchical or utilize MSCs. The test generation methods of the invention are applicable to other types of models used in testing, such as ordinary finite state machines. Furthermore, the methods for generating test cases according to the principles of the invention do not require selected test cases. A subsystem, for instance, can be selectively tested by forbidding certain transitions and without referring to or using any previously existing tests for the remainder of the system.

What is claimed is:

1. A method for generating a covering set of test cases from a directed graph, G, having a plurality of nodes and a plurality of edges connecting the nodes, a test case being a path through G, the method comprising the steps of:

classifying the nodes and edges in G as required, optional or forbidden, wherein optional edges are contained in selected test cases;

removing forbidden nodes and edges from G, wherein the removing step provides a graph, G1;

identifying unreachable nodes and strongly connected components of G1;

removing the unreachable notes and edges from G1;

replacing each of the strong connected components with a replacement node, wherein each of the replacement nodes is classified as required if the replaced strong component contained a required node or a required edge and as optional if the replaced strong component contained no required nodes or edges, wherein the removing and replacing steps provide a graph, G2;

translating node classification in G2 to equivalent edge classifications in G2, wherein the translating step provides a graph G3;

computing a deficit for each node in G3, the deficit being a difference between the required edges exiting a node and the required edges entering a mode;

constructing a network, N, from G3 using the deficits;

solving a minimum cost, maximum flow problem on N, the solving step providing a value indicating an optional edge;

constructing a graph H from N, wherein optional edges are removed from N;

constructing a graph H' by translating the equivalent edge classifications in H to node classification; and constructing a covering test case set from H'.

2. The method of claim 1, wherein the step of constructing a covering test case from H' includes the further step of transforming H' to G1.

\* \* \* \* \*